United States Patent [19]

Wan

[11] Patent Number: 5,057,483
[45] Date of Patent: Oct. 15, 1991

[54] CATALYST COMPOSITION CONTAINING SEGREGATED PLATINUM AND RHODIUM COMPONENTS

[75] Inventor: Chung-Zong Wan, Somerset, N.J.

[73] Assignee: Engelhard Corporation, Iselin, N.J.

[21] Appl. No.: 483,485

[22] Filed: Feb. 22, 1990

[51] Int. Cl.$^5$ .................. B01J 21/04; B01J 23/10; B01J 23/42; B01J 23/46
[52] U.S. Cl. ...................... 502/304; 423/213.5
[58] Field of Search .............. 502/304; 423/213.5

[56] References Cited

U.S. PATENT DOCUMENTS

| | | | |
|---|---|---|---|
| 4,587,231 | 5/1986 | Sawamura et al. | 502/304 |
| 4,727,052 | 2/1988 | Wan et al. | 502/304 X |
| 4,868,148 | 9/1989 | Henk et al. | 502/304 X |

Primary Examiner—W. J. Shine

[57] ABSTRACT

A catalyst composition suitable for three-way conversion of internal combustion engine, e.g., automobile gasoline engine, exhaust gases includes a catalytic material disposed in two discrete coats on a carrier. The first coat includes a stabilized alumina support on which a first platinum catalytic component is dispersed and bulk ceria, and may also include bulk iron oxide, a metal oxide (such as bulk nickel oxide) which is effective for the suppression of hydrogen sulfide emissions, and one or both of baria and zirconia dispersed throughout the first coat as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support. The present invention also provides a method for treating engine exhaust gases by contacting the gases under conversion conditions with the catalyst composition.

43 Claims, No Drawings

CATALYST COMPOSITION CONTAINING SEGREGATED PLATINUM AND RHODIUM COMPONENTS

BACKGROUND OF THE INVENTION

1. Field of the Invention

The present invention is concerned with catalysts useful for the treatment of gases to reduce contaminants contained therein, such as catalysts of the type generally referred to as "three-way conversion" or "TWC" catalysts. TWC catalysts are polyfunctional in that they have the capability of substantially simultaneously catalyzing both oxidation and reduction reactions, such as the oxidation of hydrocarbons and carbon monoxide and the reduction of nitrogen oxides in a gaseous stream. Such catalysts find utility in a number of fields, including the treatment of the exhaust gases from internal combustion engines, such as automobile and other gasoline-fueled engines.

2. Background and Related Art

In order to meet governmental emissions standards for internal combustion engine exhausts, so-called catalytic converters containing a suitable catalyst such as a TWC catalyst, are emplaced in the exhaust gas line of internal combustion engines to promote the oxidation of unburned hydrocarbons ("HC") and carbon monoxide ("CO") and the reduction of nitrogen oxides ("$NO_x$") in the exhaust gas. For this purpose, TWC catalysts comprising a minor amount of one or more platinum group metals distended upon a high surface area, refractory metal oxide support are well known in the art. The platinum group metal may comprise platinum or palladium, preferably including one or more of rhodium, ruthenium and iridium, especially rhodium. The refractory metal oxide support may comprise a high surface area alumina coating (often referred to as "activated" or "gamma" alumina) carried on a carrier such as a monolithic carrier comprising a refractory ceramic or metal honeycomb structure, as well known in the art. The carrier may also comprise refractory particles such as spheres or short, extruded segments of a refractory material such as alumina.

The catalytically active materials dispersed on the activated alumina may contain, in addition to the platinum group metals, one or more base metal oxides, such as oxides of nickel, cobalt, manganese, iron, rhenium, etc., as shown, for example, in C. D. Keith et al U.S. Pat. No. 4,552,732. The activated alumina typically exhibits a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases.

The refractory metal oxide supports are subject to thermal degradation from extended exposure to the high temperatures of exhaust gas resulting in a loss of exposed catalyst surface area and a corresponding decrease in catalytic activity. It is a known expedient in the art to stabilize refractory metal oxide supports against such thermal degradation by the use of materials such as zirconia, titania, alkaline, earth metal oxides such as baria, calcia or strontia or, most usually, rare earth metal oxides, for example, ceria, lanthana and mixtures of two or more rare earth metal oxides. For example, see C. D. Keith et al U.S. Pat. No. 4,171,288.

TWC catalysts are currently formulated with complex washcoat composition containing stabilized $Al_2O_3$, an oxygen storage component, primarily ceria, and precious metal catalytic components. Such catalysts are designed to be effective over a specific operating range of both lean of, and rich of, stoichiometric conditions. (The term "oxygen storage component" is used to designate a material which is believed to be capable of being oxidizing during oxygen-rich (lean) cycles of the gas being treated, and releasing oxygen during oxygen-poor (rich) cycles.) Such TWC catalyst compositions enable optimization of the conversion of harmful emissions (HC, CO and $NO_x$) to innocuous substances. Of the three precious metals, platinum, palladium and rhodium, conventionally used in TWC catalysts, rhodium is the most effective for reducing $NO_x$ to harmless nitrogen. Unfortunately, rhodium is also the most expensive of these costly materials and, consequently, effective rhodium utilization in automotive exhaust catalysts, such as TWC catalysts, has been extensively studied.

One of the problems faced by present-day catalysts is the high operating temperatures engendered by smaller automotive engines and high speed highway driving. Not only alumina support materials as noted above, but oxygen storage components are susceptible to thermal degradation at such high temperatures. Thermal degradation adversely affects the stability of the catalyst and effectiveness of the precious metals used therein. In addition, attempts to improve fuel economy by using air to fuel ("A/F") ratios higher than stoichiometric, and/or fuel shut-off features, generate a lean (oxygen-rich) exhaust. High exhaust gas temperatures and lean gas conditions accelerate the deterioration of platinum and rhodium catalysts, inasmuch as platinum is more readily sintered, and rhodium more strongly interacts with support materials such as alumina, at such conditions.

The art has devoted a great deal of effort in attempts to improve the efficiency of platinum and rhodium-based TWC compositions. Thus, U.S. Pat. No. 4,675,308 discloses a method of effective utilization of rhodium by placing it on alumina which is segregated from ceria-containing particles since ceria enhances the interaction between rhodium and alumina, which renders the rhodium less active.

U.S. Pat. No. 4,806,519 separates the rhodium component in a layered structure in which rhodium is supported on alumina in a second coat which is segregated from the ceria-containing material in a first coat. However, in both cases the rhodium is still primarily in contact with alumina support particles so that any thermal degradation occurring to the alumina will inevitably affect the catalytic efficiency of the rhodium.

The use of layered coatings in catalyst compositions is also shown in two Japanese patent publications. Japanese Patent Application 88-326823/46 (J63240-947A) of Nissan Motor KK (10.02.87-JP-027383) discloses a catalyst comprising a support having two different alumina coatings separately loaded thereon. One alumina coating contains ceria-alumina and ceria on which platinum, palladium of rhodium is dispersed, and is stated to be effective for CO and HC removal. The other alumina coating, which is stated to be effective for $NO_x$ removal, is made from lanthana-alumina and zirconia oxide partially stabilized with Pr and on which palladium or rhodium is dispersed. The catalyst is stated to have TWC activity.

Nissan Motor Company Ltd. Japanese patent publication JP63 77,544 (88 77,544), 7 April 1988, discloses a catalyst comprising a first washcoat containing activated alumina bearing rare earth oxides, and a second washcoat disposed over the first washcoat and containing activated aluminum bearing rare earth oxides, mainly ceria and zirconia. Palladium is kept away from poisonous substances near the washcoat surfaces and forms LA-O-Pd in the first washcoat and Rh-O-Zr in the second washcoat.

Co-pending and commonly assigned U.S. patent application Ser. No. 07/234,226 presents a method to improve thermal stability of a TWC catalyst containing platinum and rhodium by incorporating a barium compound and a zirconium compound together with ceria in bulk form. This is stated to enhance stability of the alumina washcoat upon exposure to high temperature.

In another approach, U.S. Pat. No. 4,233,189 teaches the use of non-alumina supports such as zirconia for rhodium, so that rhodium-alumina interaction can be avoided. However, zirconia has a lower surface area than gamma alumina and itself is not a thermally stable support. Zirconia undergoes a phase transition between its monoclinic crystalline structure and its more stable tetragonal crystalline structure over a wide temperature range. Such transition causes drastic sintering of the associated precious metals. Thus, a need still exists for improved stabilization against thermal degradation of precious metals containing TWC catalysts.

SUMMARY OF THE INVENTION

In accordance with the present invention there is provided a catalyst composition comprising a carrier on which is disposed a catalytic material, the catalytic material comprising the following components contained in two coats. A first coat is carried on the carrier and comprises a first activated alumina support on which is dispersed a catalytically effective amount of a first platinum catalytic component. A catalytically effective amount of bulk ceria is included in the first coat. Optionally, the first coat may also include a bulk iron oxide and a catalytically effective amount of metal oxide effective for the suppression of secondary emissions such as $H_2S$. The metal oxide may comprise, for example, bulk nickel oxide. The first coat may optionally also include a thermal stabilizer dispersed therein, for example, one or both of baria and zirconia may be dispersed in the first coat, e.g., on both the alumina and the bulk ceria thereof, in an amount sufficient to stabilize the alumina and bulk ceria against thermal degradation. The carrier also carries a second coat, which optionally may comprise a topcoat overlying the first coat and comprising a co-formed rare earth oxide-zirconia support, a catalytically effective amount of a first rhodium catalytic component dispersed on the co-formed zirconia support, a second activated alumina support, and a catalytically effective amount of a second platinum catalytic component dispersed on the second alumina support. In addition to the above-specified second coat ingredients, the second coat may optionally include a second rhodium catalytic component dispersed either on the second activated alumina support (on the alumina particles on which the second platinum catalytic component is also dispersed) or on a third activated alumina support. Optionally, a third platinum catalytic component may be dispersed, together with the second rhodium catalytic component, on the third activated alumina support. The second coat, like the first coat, may optionally include a thermal stabilizer dispersed therein in an amount sufficient to stabilize the second activated alumina support (and the third activated alumina support, if present, against thermal degradation). The thermal stabilizer dispersed in the second coat may comprise zirconia.

Other aspects of the present invention provide for the inclusion of one or more of the following features, singly or in a combination of two or more of them. Thus, the metal oxide effective for the suppression of secondary emissions such as $H_2S$ may be one or more of oxides of nickel, copper, manganese and germanium; the thermal stabilizer in the first coat may be one or more of ceria, baria and zirconia; and the rare earth oxide of the co-formed rare earth oxide-zirconia support may be one or more of oxides of cerium, neodymium and yttrium, preferably cerium oxide.

Another aspect of the present invention provides that the carrier may comprise a refractory body having a plurality of substantially parallel passages extending therethrough, the passages being defined by walls and the catalytic material being coated on the walls as the aforesaid first coat and second coat.

In accordance with the present invention there is also provided a method for treating a gas such as the exhaust of an internal combustion engine, especially a gasoline-fueled engine, which contains noxious components such as one or more of carbon monoxide, hydrocarbons and nitrogen oxides. The method comprises converting at least some of these noxious components to innocuous substances by contacting the gas under conversion conditions with a catalyst composition as described above. As used herein and in the claims, "conversion conditions" means conditions suitable for the catalyst composition of the invention to catalyst the reaction of one or more (usually all three) of hydrocarbons, carbon monoxide and nitrogen oxides to "innocuous substances", i.e., to water, carbon dioxide and nitrogen. The catalyst compositions of the present invention are capable of acting as TWC catalysts, i.e., catalyzing substantially simultaneous conversion of CO, HC and $NO_x$.

As used herein and in the claims, the term "co-formed" as used with respect to the rare earth oxide-zirconia support material, means that the rare earth oxide or oxides are dispersed substantially throughout the entire matrix of the zirconia particles as will occur, for example, when the rare earth oxide(s) and zirconium oxide, or predecessors thereof, are co-precipitated or co-gelled. The defined term is intended to distinguish from the situation in which rare earth oxides are merely dispersed on or near the surface of the zirconia particles, leaving the core of the particles largely or entirely free of the rare earth oxide(s).

DETAILED DESCRIPTION OF THE INVENTION AND SPECIFIC EMBODIMENTS THEREOF

The catalyst composition of the present invention provides a first group of selected components in a first coat of catalytic material, and a second group of selected components in a second coat of catalytic material, in order to physically segregate the components of the respective coats. The first and second coats are discrete coats, each having its own composition and identity, and are carried on a suitable carrier by being adhered to the carrier (or, in the case of the second coat, by being adhered to the underlying first coat) as a thin, adherent coating. The catalyst composition of the invention usually comprises a carrier of the type often referred to as a honeycomb or monolithic carrier, which carrier is a solid body characterized by having a plurality of fine, substantially parallel, continuous and openended gas flow passages extending therethrough. The catalytic material is dispersed as a coating on the carrier, specifically, on the walls of the gas flow passages thereof. Such carriers are normally made of a refractory, ceramic-like material such as cordierite, mullite, alumina, or any other suitable refractory material; they may also be made of a refractory metal such as stainless steel or other suitable corrosion-resistant, iron based alloys.

The discrete first and second coats of catalytic material, conventionally referred to as "washcoats", are coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the first coat catalytic material, and dried, and the undipped downstream longitudinal segment of the carrier would then be dipped into a slurry of the second coat catalytic material and dried. Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy.

The First Coat

The first coat (the bottom coat in the preferred overlying-coat configuration of the catalyst composition) may contain at least a major portion of the platinum component of the catalyst. It is preferred to deposit the platinum component, or at least the major portion thereof, on an activated alumina support forming part of the first coat of catalytic material. The activated alumina on which the platinum catalytic component is dispersed is stabilized against thermal degradation by one or both of baria and zirconia, as described below. The platinum catalytic component may be dispersed onto the activated alumina support by any suitable technique. Usually, this is carried out by impregnating a slurry of fine particulate alumina with a solution or dispersion of a soluble platinum compound or complex and then drying and calcining the thus-impregnated alumina support particles to provide the platinum catalytic component dispersed thereon. (This technique of impregnating a slurry of fine, particulate support material may also be used for dispersing the other catalytic components, such as a rhodium catalytic component, onto their respective supports.) The platinum catalytic component thus dispersed on a thermally stabilized (as described below) activated alumina support is believed to serve, in the composition of the present invention, the usual function of such platinum catalytic components of catalyzing at least the conversion of CO to $CO_2$ and of HC to water and $CO_2$.

The quantity of ingredients in the catalyst composition may be expressed as the weight of such ingredients per unit volume of the catalyst composition. This is particularly useful for a catalyst composition in which the carrier is a honeycomb-type body because this basis of expression accounts for the voids in the catalyst composition provided by the gas flow passages extending therethrough. For ingredients other than precious metals, a convenient basis is grams per cubic inch ("g/in$^3$") of the catalyst composition and for precious metals, grams per cubic foot ("g/ft$^3$") of the catalyst composition. On this basis of measurement, the activated alumina may be present in the first coat in an amount of from about 0.1 to 4.0 g/in$^3$ and the first platinum catalytic component may be present in an amount of from about 5 to 100 g/ft$^3$.

In addition to the platinum catalytic component, the first coat may optionally contain a palladium catalytic component dispersed on an activated alumina support. The palladium catalytic component may be present in an amount of up to about 100 g/ft$^3$, that is, from 0 to 100 g/ft$^3$, e.g., from 0.1 to 100 g/ft$^3$. The palladium catalytic component, if present, may be dispersed on the first activated alumina support, individual particles of which may contain both platinum and palladium catalytic components dispersed thereon or the palladium catalytic component may be dispersed on its own thermally stabilized activated alumina support particles, and mixed into the first coat composition.

The first coat or washcoat layer further includes bulk rare earth oxides including ceria, preferably bulk ceria of at least 90 percent purity as $CeO_2$, more preferably 95 percent or 99 percent $CeO_2$, with the balance substantially comprising other rare earth metal oxides. The utilization of such high purity bulk ceria in a catalyst composition is disclosed, for example, in U.S. Pat. No. 4,714,694 of C. Z. Wan et al in connection with catalysts comprising an aluminastabilized bulk ceria. As disclosed in this patent, the bulk ceria contains at least about 95, or at least about 99 or 99.5, percent by weight $CeO_2$, with the predominant impurity comprising lanthana with lesser amounts of other rare earth oxides. The amount of bulk ceria in the first coat of the catalyst composition may be at least about 0.15 g/in$^3$ of the finished catalyst composition, for example, from about 0.15 to 1.5 g/in$^3$ of the finished catalyst composition.

The first coat may further include iron oxide, preferably introduced into the manufacturing procedure of the catalyst as $Fe_3O_4$ (magnetite) because in this form the iron oxide is insoluble in the milling media normally utilized to prepare the washcoats of the invention. The iron oxide, which may be introduced in bulk form, is catalytically effective for promoting CO oxidation.

The first coat may also include a metal oxide, for example, bulk nickel oxide, which is effective for the suppression of any $H_2S$ which may be present. The $H_2S$ suppressor may thus be in bulk form and the iron oxide is in bulk form, the bulk form oxides preferably comprising particles of at least 0.1 micron in diameter. Such bulk metal oxides are not significantly soluble in the washcoat slurry used during preparation of the catalyst composition and do not readily react with activated alumina particles to form undesirable composite or combined materials which reduce the thermal stability of the activated alumina.

The iron oxide, if present, is preferably employed in an amount of about 0.05 g/in$^3$ to 0.3 g/in$^3$ of iron oxide. The iron oxide serves as a promoter for the oxidation of CO to carbon dioxide. Any form of ferrous or ferric oxide is suitable for use as the CO oxidation promoter, but Fe$_3$O$_4$ is preferred as it is insoluble in the ballmilling medium used to prepare the washcoats. It is preferable not to incorporate the iron oxide in a dispersed form on the alumina, i.e., by impregnation of the alumina with an iron salt solution and then calcining, and consequently the iron oxide is provided in bulk form. As with the other bulk ingredients, "bulk" means that the iron oxide is added as fine particles, preferably of at least 0.1 microns size (diameter), of solid iron oxide, rather than being dispersed into the other ingredients as by being impregnated into the composition in the form of a soluble iron salt.

The metal oxide effective for the suppression of H$_2$S emissions may be any suitable metal oxide which serves the purpose. Nickel oxide, preferably bulk nickel oxide, is a preferred component for this purpose although other oxides such as germanium oxide, copper oxide and manganese oxide are also known to be suitable for the purpose. The H$_2$S suppressor ingredient is useful because ceria and alumina tend to trap sulfur compounds on their surfaces. The sulfur compounds, which result from the combustion of sulfur contained in gasoline, are converted to hydrogen sulfide during transient fuel-rich operating conditions such as idling and acceleration, and provide a characteristic foul odor to the exhaust gases. A suitable metal oxide H$_2$S suppressor such as nickel oxide will at least temporarily trap any hydrogen sulfide which is formed, thereby delaying the discharge of hydrogen sulfide from the catalyst. During transient fuellean operation the sulfides are oxidized or otherwise decomposed in the oxygen rich environment, and the hydrogen sulfide is converted to various sulfates. The quantity of the metal oxide used depends on its hydrogen sulfide-trapping capacity. Generally, the metal oxide loading in the catalyst composition is typically from about 0.05 g/in$^3$ to 0.5 g/in$^3$, measured as the metal oxide, e.g., NiO. When the metal oxide used for suppressing the release of H$_2$S comprises nickel oxide, it is desirable not to deposit the NiO in a dispersed form (e.g., from solution) on alumina. Consequently, the nickel oxide is preferably incorporated into the first coat as a bulk fine particulate material.

In contrast, the thermal stabilizer used in the first coat, which may be baria or zirconia or both, is incorporated into the other ingredients in dispersed form by impregnation of the bulk ingredients (alumina, ceria, etc.) with solutions or other dispersions of soluble compounds or complexes of barium and/or zirconium salts, followed by drying and calcination of the impregnated bulk materials. This may be accomplished by using an impregnation technique similar to that described above with respect to impregnating the platinum catalytic component onto the activated alumina support material. Thus, soluble salts of zirconium and/or barium may be dissolved in an aqueous solution and the solution used to impregnate the washcoat components of the first coat. The soluble salts, such as nitrates, are decomposed to oxides during the calcining of the catalyst composition and the resultant zirconium and barium oxides, by being incorporated into the activated alumina and the other bulk metal oxides present, serve to stabilize these materials against thermal degradation. The alumina, ceria, etc., are thus stabilized against thermal degradation. The amount of such thermal stabilizers, if present, is preferably from about 0.05 g/in$^3$ to 0.5 g/in$^3$, calculated as the metal oxide, for each thermal stabilizer utilized.

The contents of the first coat of catalytic material may therefore comprise platinum dispersed on a thermally stabilized (with baria or zirconia or both) activated alumina, bulk cerium oxide, bulk iron oxide and a metal oxide, which may be in bulk form, such as bulk nickel oxide, which is effective for suppressing the emission of hydrogen sulfide. The bulk ceria, iron oxide and nickel oxide may also be impregnated with the stabilizing baria and or zirconia, which is preferably dispersed throughout the first coat by impregnating all the solids thereof by the above described technique of impregnation with solutions of soluble barium and/or zirconium compounds, followed by calcination.

The first coat may also contain other components useful in such catalytic compositions. For example, as noted above, a palladium catalytic component may also be dispersed on activated alumina particles. The first coat composition may also contain other components known to be useful as components of a catalytic washcoat for this type of catalyst, including a supplementary refractory metal oxide to enhance washcoat porosity, such as one provided by crushed cordierite. The inclusion of a high porosity refractory metal oxide such as crushed cordierite enhances the overall porosity of the first coat, thereby facilitating the passage therethrough of the gas being treated by the catalyst composition.

The Second Coat

The second coat of catalytic material, i.e., the top coat in the overlying-coat preferred embodiment of the present invention, contains a rhodium catalytic component which is dispersed on zirconium support particles which are co-formed with, and stabilized by, one or more rare earth oxides, such as cerium oxide, neodymium oxide and yttrium oxide, preferably cerium oxide (ceria). The stabilized, co-formed rare earth oxide-zirconia support preferably contains from about 2 to 30% by weight of rare earth oxides, preferably ceria, balance predominantly or entirely zirconia. Other rare earth oxides may be present in small or trace amounts. The function of the rare earth oxides dispersed throughout the zirconia matrix is to stabilize the zirconia against thermal degradation. For example, unstabilized zirconia undergoes a phase transition, with drastic loss of surface area, at about 950° C., but the co-formed rare earth oxide-zirconia support containing 12 weight percent CeO$_2$ exhibits a tetragonal crystalline structure throughout the temperature range of TWC catalyst use (up to about 1000° C.) without undergoing significant thermal degradation.

The co-formed rare earth oxide-zirconia support, sometimes herein and in the claims referred to simply as the "co-formed zirconia support" may be made by any suitable technique such as co-precipitation, co-gelling or the like. One suitable technique is illustrated in the article by Luccini, E., Mariani, S., and Sbaizero, O. (1989) "Preparation of Zirconia Cerium Carbonate in Water With Urea", *Int. J. of Materials and Product Technology*, vol. 4, no. 2, pp. 167-175, the disclosure of which is hereby incorporated herein. As disclosed starting at page 169 of the article, a dilute (0.1M) distilled water solution of zirconyl chloride and cerium nitrate in proportions to promote a final product of $ZrO_2$ - 10 mol % $CeO_2$ is prepared with ammonium nitrate as a buffer, to control pH. The solution was boiled with constant stirring for two hours and complete precipitation was attained with the pH not exceeding 6.5 at any stage.

Any other suitable technique for preparing the co-formed rare earth oxide-zirconia may be employed, provided that the resultant product contains the rare earth oxide dispersed substantially throughout the entire zirconia matrix in the finished product, and not merely on the surface of the zirconia particles or only within a surface layer, thereby leaving a substantial core of the zirconia matrix without rare earth oxide dispersed therein. Thus, the zirconium and cerium (or other rare earth metal) salts may include chlorides, sulfates, nitrates, acetates, etc. The co-precipitates may, after washing, be spray dried or freeze dried to remove water and then calcined in air at about 500° C. to form the co-formed rare earth oxide-zirconia support.

Other metal oxide stabilizers suitable for being co-formed with the zirconia include magnesium, calcium and yttrium oxides. Oxides of these elements, as well as of cerium, are known as good zirconia stabilizers in the ceramic industry. However, in catalytic applications, zirconia not only has to withstand high temperature degradation due to phase transformation, but also has to possess a sufficiently high surface area to enable suitable dispersion thereon of the rhodium catalytic component. For this reason, and because the rare earth oxide is to be dispersed throughout substantially the entire matrix of the zirconia particles, the rare earth oxide stabilizer is not used in bulk, i.e., solid particulate, form for zirconia stabilization but is co-formed with the zirconia as described above. Further, rhodium tends to interact with bulk ceria in a manner which is deleterious to catalytic performance. Accordingly, the ceria is co-formed with the zirconia as described above. In addition, since the solubility of ceria in zirconia to form a homogeneous solid solution is about 10 mol percent, the amount of rare earth oxide co-formed with the zirconia is limited to not more than about 30 weight percent rare earth oxide, based on the weight of rare earth oxide plus zirconia, in order to avoid or minimize undesirable interaction between the rhodium catalytic component dispersed into the co-formed zirconia support, and the rare earth oxides, it being known that such interaction renders the rhodium less catalytically active. It should be noted that it is not necessary, in order to attain the benefits of the present invention, to have a homogeneous solid solution of rare earth oxide(s) in zirconia, but such homogeneous solid solution is included in the term "co-formed rare earth oxide-zirconia support". The amount of co-formed zirconia support present in the second coat is preferably not less than about 0.05 g/in$^3$, and may range from about 0.05 to 1.0 g/in$^3$.

A first rhodium catalytic component is dispersed on the co-formed zirconia support and may be present in an amount of from about 0.03 to 1.0, preferably from about 0.1 to 0.6 weight percent rhodium, calculated as rhodium metal and based on the weight of rhodium plus the co-formed zirconia support. Stated otherwise, the first rhodium catalytic component may be present in an amount of from about 0.1 to 15 g/ft$^3$ of catalyst composition. The rhodium may be dispersed on the co-formed zirconia support by an impregnation technique similar to that described above with respect to impregnating the platinum onto the alumina support in the first coat.

The rhodium-impregnated co-formed zirconia support is heated to thermally fix the rhodium on the support, typically by first drying the rhodium-impregnated support and then heating it in air at about 450° C. The rhodium, when dispersed on a particulate, co-formed rare earth oxide-zirconia support as described above, serves its usual function of catalyzing the oxidation of CO and the reduction of $NO_x$ in the gases being treated, even after high temperature engine aging, and without significant loss of activity.

The second coat includes a second activated alumina support on which a second platinum catalytic component is dispersed. The second platinum catalytic component provides capacity for catalyzing the conversion of CO to $CO_2$ and HC to $CO_2$ and $H_2O$ in the second coat. This supplements the CO and HC conversion capability of the first coat. The second platinum catalytic component may be dispersed into the second activated alumina particles by an impregnation technique similar to that described above with respect to the first platinum catalytic component of the first coat. The second platinum catalytic component is preferably thermally fixed on the second activated alumina before the platinum-impregnated second activated alumina is incorporated into the second coat. The second platinum catalytic component is present in an amount of from about 0.05 to 5.0 weight percent of the combined weight of the second platinum catalytic component (as platinum metal) and the activated alumina support (including the weight of any thermal stabilizers, measured as metal oxide, impregnated into the support). Stated otherwise, the second platinum catalytic component is present in an amount of from about 1 to 50 g/ft$^3$ of catalyst composition. The second activated alumina support present in the second coat is preferably present in an amount of from about 0.1 to 2.0 g/in$^3$.

The second coat may, like the first coat, be stabilized against thermal degradation. Although a number of thermal stabilizers such as alkaline earth metal oxides and rare earth metal oxides, including ceria, are useful to thermally stabilize activated alumina, zirconia is preferred as a stabilizer for the activated alumina used in the second coat. Thus, the second activated alumina is stabilized with zirconia and may be prepared by comminuting activated alumina particles to a desired size range, and then impregnating the comminuted particles with a solution of a soluble zirconium salt. After the impregnation, the impregnated alumina particles are calcined to convert the impregnated zirconium salt, e.g., zirconium nitrate, to zirconia. The amount of zirconia used to thermally stabilize the second activated alumina (and any other activated alumina used in the second coat, e.g., the third activated alumina described below) is from about 0.02 to 0.5 g/in$^3$ of catalyst composition.

If it is desired to incorporate into the second coat a quantity of rhodium in excess of that which can be dispersed on the zirconia support or, if it is desired for any reason to disperse part of the rhodium catalytic component content of the second coat on a support other than the co-formed rare earth oxide-zirconia support, an additional, second rhodium catalytic component may be dispersed on an activated alumina support, which may be the second activated alumina support. Thus, the second activated alumina support may have both platinum and rhodium catalytic components dispersed therein. Alternatively, the second rhodium catalytic component may be dispersed on activated alumina particles comprising a third activated alumina support. In such case, the second platinum catalytic component is supported on one batch of activated alumina (the second activated alumina) and the second rhodium catalytic component is supported on a separate batch of activated alumina (the third activated alumina). The second rhodium catalytic component may be dispersed into its activated alumina support particles (the second or third activated alumina support, as the case may be) by impregnating the comminuted particles with a solution of a soluble rhodium salt such as rhodium chloride, rhodium nitrate, etc. The impregnated particles are then dried and calcined to form an activated rhodium catalytic component, using techniques well known in the art.

The total rhodium catalytic component present in the second coat (the sum of the rhodium present as both the first rhodium catalytic component dispersed on the co-formed zirconia support and the second rhodium catalytic component dispersed on the activated alumina) may range from about 0.1 to 15 g/ft$^3$.

It is therefore seen that the contents of the second coat of catalytic material may therefore comprise rhodium (the first rhodium catalytic component) dispersed on a coformed rare earth oxide-zirconia support and platinum (the second platinum catalytic component) dispersed on an activated alumina support (the second activated alumina support). In addition, additional rhodium, the second rhodium catalytic component, may be dispersed on the same alumina particles as the platinum or may be dispersed on a separate batch of activated alumina particles (the third activated alumina support). The second coat may have a thermal stabilizer comprising zirconia dispersed therethrough.

Preparation of The Catalyst

Generally, the catalyst composition of the present invention is prepared by coating a suitable carrier, such as a cordierite honeycomb carrier, with a first coat comprising a washcoat containing the first coat ingredients described above, essentially comprising a platinum catalytic component dispersed on activated alumina particles and bulk cerium oxide and, optionally, the other described ingredients. The catalyst may be prepared by the known technique of preparing the ingredients in an aqueous slurry into which the carrier is dipped. Excess slurry is blown by compressed air from the passages of the carrier, and the coated carrier is then dried and calcined. The resultant first coat-containing carrier is then dipped into an aqueous slurry of the abovedescribed ingredients of the second coat, that is, into an aqueous slurry essentially including co-formed rare earth oxide-zirconia support particles onto which a rhodium catalytic component has been dispersed, and an activated alumina on which a platinum catalytic component and, optionally, the other described ingredients. The thus second-coated carrier is again dried and calcined, to provide the finished catalyst composition.

Certain embodiments of the invention and the efficacy thereof are demonstrated by the following Examples.

EXAMPLE 1

A. The First Coat

A quantity of 829 grams of gamma alumina powder having a surface area of 150 square meters per gram ("150 m$^2$/g") was impregnated with an amine-solubilized aqueous platinum hydroxide (H$_2$Pt(OH)$_6$) solution containing 10.5 grams of platinum. The platinum-containing alumina, 995 grams of bulk ceria (99 weight percent CeO$_2$, having a surface area of 110 m$^2$/g), zirconia acetate solution containing 165.8 grams of ZrO$_2$, and 227.4 grams of barium hydroxide hydrate crystals were ballmilled with water and acetic acid to form a slurry. A quantity of 2000 grams of the slurry (solids basis) was further mixed with 105.4 grams pulverized low surface area NiO powder, and 105.4 grams Fe$_3$O$_4$ powder to form a washcoat coating slurry. A monolith support of cordierite containing about 400 flow passages per square inch of cross section was dipped into the washcoat slurry. The resultant catalyzed monolith after calcination at 450° C. contains 16.37 g/ft$^3$ Pt, 0.75 g/in$^3$ alumina, 0.9 g/in$^3$ CeO$_2$, 0.1 g/in$^3$ BaO, 0.15 g/in$^3$ ZrO$_2$, and 0.1 g/in$^3$ Fe$_2$O$_3$.

B. The Second Coat

A quantity of 800 grams of alumina powder containing 0.86 percent by weight of platinum were prepared by impregnating the alumina powder with the aqueous amine solubilized platinum salt previously described and calcining the impregnated alumina. Subsequently to calcining, the alumina was ballmilled with water and nitric acid to form a slurry. A quantity of 436.4 grams of cerium oxide-stabilized zirconia powder (12 weight percent CeO$_2$, having a surface area of 55 m$^2$/g) was impregnated with rhodium nitrate solution containing 1.22 grams rhodium. The wet powder was dried and then calcined at 450° C. to obtain containing 0.28 weight percent rhodium, measured as rhodium metal. This powder was the mixed with the platinum-containing slurry to form a platinum- and rhodium-containing slurry. A quantity of 1200 grams (solids basis) of the platinum-rhodium slurry was further impregnated with rhodium nitrate solution containing 0.82 grams of rhodium. A zirconium acetate aqueous solution containing 70.6 grams ZrO$_2$ was then added to the slurry. The final coating slurry contained roughly 30 percent by weight solids. The monolith coated with the first coat in Part A of this Example was dipped in the platinum- and rhodium-containing slurry. After drying the dipped monolith and then calcining it at 450° C., the monolith picked up an additional 0.9 g/in$^3$ of washcoat containing 2.455 g/ft$^3$ Rh, 8.18 g/ft$^3$ Pt, 0.55 g/in$^3$ alumina, 0.3 g/in$^3$ cerium stabilized zirconia and 0.05 g/in$^3$ ZrO$_2$. The final catalyzed monolith contained 27 g/ft$^3$ of precious metals at 10 Pt/1 Rh weight ratio.

EXAMPLE 2 (COMPARATIVE EXAMPLE)

A monolithic catalyst was prepared by impregnating 784 grams of gamma alumina powder having a surface area of 150 square meters per gram ("150 m$^2$/g") with an amine-solubilized aqueous platinum hydroxide solution containing 10.0 grams of platinum. The wet powder was thereafter impregnated with an aqueous rhodium nitrate solution containing 1.0 grams of rhodium. Finally, an aqueous solution containing 14 ml of acetic acid was dispersed uniformly into the wet alumina powder.

The platinum- and rhodium-containing alumina powder plus 524.8 grams of bulk ceria (99 weight percent purity CeO$_2$, having a surface area of 110 m$^2$/g), zirconium acetate solution containing 183.3 grams of ZrO$_2$ and 201.6 grams of barium hydroxide hydrate crystals were ballmilled with water and acetic acid to form a slurry. 1500 grams of the slurry (solids basis) was further mixed with 96 grams of pulverized low surface area NiO powder to form a washcoat coating slurry. A cordierite monolith containing 400 flow passages per square inch of cross section was dipped into the coating slurry, dried at a60° C. and then calcined at 500° C. The final catalyst contained 27 g/ft$^3$ of precious metals at a 10 Pt/1 Rh weight ratio and 0.75 g/in$^3$ CeO$_2$, 0.14 g/in$^3$ BaO, BaO, 0.26 g/in$^3$ ZrO$_2$ and 0.15 g/in$^3$ NiO, in addition to 1.135 g/in$^3$ alumina.

EXAMPLE 3 (COMPARATIVE EXAMPLE)

A monolithic catalyst was prepared according to the method described in Example 1, except that the layered structure was replaced with one homogeneous coating of the same total composition, that is, the separate ingredients of the discrete first and second coats were combined into a single washcoat into which the monolithic was dipped. The final catalyzed monolith therefore also contained 27 g/ft$^3$ PM at 10 Pt/1 Rh ratio.

EXAMPLE 4

The catalysts, 85 in$^3$ in volume each, produced according to Examples 1, 2 and 3 were individually loaded in converters of identical shape. The converters were then individually aged on a 4.3 liter V-6 engine at a converter inlet temperature of 7800° C. for 75 hours using a specific aging cycle. The aging cycle consists of four phases totalling 60 seconds.

1. First phase lasts 40 seconds and engine operates at stoichiometric set point in steady state.
2. Second phase for 6 seconds and engine operates bias rich which produces 3 percent CO in the exhaust.
3. Third phase for 10 seconds and the engine operates similar to phase 2 except secondary air in injected to generate 3 percent O$_2$ in the exhaust.
4. Fourth phase for 4 seconds and engine operates back to normal stoichiometric setting similar to phase I while the air injection continues.

After the aging the catalysts were evaluated on a V-8 engine dynamometer at an inlet temperature of 482° C. and 40,000 hr-1 space velocity wherein the air-to-fuel ratio (A/F) employed was fluctuated +/− 0.5 A/F units at 1 Hz perturbations. The results of catalytic efficiencies are summarized in TABLE 1.

TABLE I

Conversion Efficiency of Engine Aged Monolithic Catalysts
% Conversion at Air to Fuel Weight Ratio (A/F) Shown

| Catalyst | AF = 14.45 (AFU = −0.2) | | | AF = 14.64 (Stoich.) | | | AF = 14.85 (AFU = +0.2) | | |
|---|---|---|---|---|---|---|---|---|---|
| | HC | CO | NO$_x$ | HC | CO | NO$_x$ | HC | CO | NO$_x$ |
| Example 1 | 84 | 46 | 94 | 89 | 89 | 82 | 89 | 100 | 46 |
| Example 2 | 84 | 44 | 91 | 89 | 71 | 74 | 89 | 93 | 47 |
| Example 3 | 71 | 43 | 73 | 90 | 92 | 82 | 89 | 99 | 36 |

("AFU" = air to fuel ratio units, "Stoich." = stoichiometric A/F)

By reference to TABLE I, it is immediately apparent that the catalyst composition according to one embodiment of the present invention (Example 1) outperformed the comparative catalyst compositions of Examples 2 and 3. The results of Example 1 as compared to Example 2 show the superiority of the catalyst composition of Example 1 as compared to the different composition of Example 2. The two-coat layered structure of this invention (Example 1) is seen to exhibit after aging of the catalysts, a winder operating window than the homogeneous, single layer structure of Example 3, which is of practically the same overall composition as Example 1.

While the invention has been described in detail with respect to specific preferred embodiments thereof, it will be apparent that upon a reading and understanding of the foregoing, variations thereto may occur to those skilled in the art, which variations lie within the scope of the appended claims.

What is claimed is:

1. A catalyst composition comprising a carrier on which is disposed a catalytic material, the catalytic material comprising:
   a first coat carried on the carrier and comprising a first activated alumina support, a catalytically effective amount of a first platinum catalytic component dispersed on the first alumina support, and a catalytically effective amount of bulk ceria; and
   a second coat carried by the carrier and comprising a co-formed rare earth oxide-zirconia support, a catalytically effective amount of a first rhodium catalytic component dispersed on the co-formed rare earth oxide-zirconia support, a second activated alumina oxide-zirconia support, and a catalytically effective amount of a second platinum catalytically component dispersed on the second alumina support.

2. The catalyst composition of claim 1 wherein the second coat comprises a topcoat overlying the first coat.

3. The catalyst composition of claim 1 or claim 2 wherein the first coat further includes an effective amount of a metal oxide effective for the suppression of H$_2$S emissions from the catalyst.

4. The catalyst composition of claim 3 wherein the metal oxide effective for the suppression of H$_2$S is selected from the group consisting of one or more of oxides of nickel, copper, manganese and germanium.

5. The catalyst composition of claim 1 or claim 2 wherein the first coat further includes bulk iron oxide in a catalytically effective amount for promoting the oxidation of CO.

6. The catalyst composition of claim 5 wherein the bulk iron oxide comprises magnetite (Fe$_3$O$_4$).

7. The catalyst composition of claim 5 wherein the bulk iron oxide is present in an amount of from about 0.05 to 0.3 grams per cubic inch of catalyst composition, calculated as Fe$_2$O$_3$.

8. The catalyst composition of claim 1 or claim 2 wherein the second coat further includes a catalytically effective amount of a second rhodium catalytic component dispersed on the second activated alumina support.

9. The catalyst composition of claim 1 or claim 2 wherein the second coat further includes a third activated alumina support and a catalytically effective amount of a second rhodium catalytic component dispersed on the third alumina support.

10. The catalyst composition of claim 9 further including a third platinum catalytic component dispersed on the third alumina support.

11. The catalyst composition of claim 1 or claim 2 wherein the first coat further includes a thermal stabilizer dispersed therein in an amount sufficient to stabilize the first activated alumina and the bulk ceria against thermal degradation.

12. The catalyst composition of claim 11 wherein the thermal stabilizer is selected from the group consisting of one or more of ceria, baria and zirconia.

13. The catalyst composition of claim 11 wherein the thermal stabilizer is selected from the group consisting of baria and zirconia.

14. The catalyst composition of claim 11 wherein the thermal stabilizer comprises both baria and zirconia.

15. The catalyst composition of claim 13 wherein the baria and the zirconia are each present in an amount of from about 0.05 to 0.5 to grams per cubic inch of catalyst composition.

16. The catalyst composition of claim 1 or claim 2 wherein the rare earth oxide of the co-formed rare earth oxide-zirconia support is selected from the group consisting of one or both of oxides of cerium and neodymium.

17. The catalyst composition of claim 1 or claim 2 wherein the rare earth oxide of the co-formed rare earth oxide-zirconia support is cerium oxide.

18. The catalyst composition of claim 1 or claim 2 wherein the first rhodium catalytic component is present in an amount of from about 0.03 to 1.0 weight percent of the combined weight of rhodium plus said co-formed support, the weight of rhodium being calculated as the metal.

19. The catalyst composition of claim 1 or claim 2 wherein the bulk ceria in the first coat comprises at least about 0.15 grams per cubic inch of catalyst composition.

20. The catalyst composition of claim 1 or claim 2 wherein the bulk ceria in the first coat is present in an amount of from about 0.15 to 1.5 grams per cubic inch of catalyst composition.

21. The catalyst composition of claim 3 wherein the metal oxide effective for the suppression of $H_2S$ is present in an amount of from about 0.05 to 0.5 grams per cubic inch of catalyst composition, calculated as the metal oxide.

22. The catalyst composition of claim 21 wherein the metal oxide comprises bulk nickel oxide and its weight is calculated as NiO.

23. The catalyst composition of claim 1 or claim 2 wherein the bulk ceria comprises at least 90 percent by weight $CeO_2$, the balance comprising other rare earth oxides.

24. The catalyst composition of claim 1 or claim 2 wherein the second coat further includes a thermal stabilizer dispersed therein in an amount sufficient to stabilize the second activated alumina support against thermal degradation.

25. The catalyst composition of claim 24 wherein the thermal stabilizer comprises zirconia.

26. The catalyst composition of claim 25 wherein the zirconia for alumina stabilization is present in an amount of about 0.02 to 0.05 grams per cubic inch of catalyst composition.

27. The catalyst composition of claim 1 or claim 2 wherein the rare earth oxide of the co-formed rare earth oxide-zirconia support comprises ceria and is present in an amount of from about 2 to 30 percent by weight of the combined weight of ceria and zirconia in the co-formed zirconia support.

28. The catalyst composition of claim 1 or claim 2 wherein the first coat further comprises crushed cordierite.

29. The catalyst composition of claim 1 or claim 2 wherein the co-formed rare earth oxide-zirconia support is present in an amount of from about 0.05 to 1.0 grams per cubic inch of the catalyst composition.

30. The catalyst composition of claim 1 or claim 2 wherein the second platinum catalytic component is present in an amount of from about 0.05 to 5.0 weight percent of the combined weight of platinum, measured as the metal, and the activated alumina in the second coat.

31. The catalyst composition of claim 1 or claim 2 wherein the activated alumina is present in the first coat in an amount of from about 0.1 to 4.0 grams per cubic inch of catalyst composition.

32. The catalyst composition of claim 1 or claim 2 wherein the activated alumina is present in the second coat in an amount of from about 0.10 to 2.0 grams per cubic inch of the catalyst composition.

33. The catalyst composition of claim 1 or claim 2 wherein the first platinum catalytic component is present in the first coat in an amount of from about 5 to 100 grams per cubic foot of catalyst composition.

34. The catalyst composition of claim 1 or claim 2 wherein the second platinum catalytic component is present in the second coat in an amount of from about 1 to 50 grams per cubic foot of catalyst composition.

35. The catalyst composition of claim 1 or claim 2 wherein the total amount of rhodium catalytic component present in the catalyst composition is present in an amount of from about 0.1 to 15 grams per cubic foot of catalyst composition.

36. The catalyst composition of claim 1 or claim 2 further including up to 100 grams per cubic foot of palladium catalytic component dispersed on the activated alumina support in the first coat.

37. The catalyst composition of claim 1 or claim 2 wherein the carrier comprises a refractory body having a plurality of substantially parallel passages extending therethrough, the passages being defined by walls and the catalytic material being coated on the walls as said first coat and said second coat.

38. A catalyst composition comprising a carrier on which is disposed a catalytic material, the catalytic material comprising:
a first coat carried on the carrier and comprising a first activated alumina support, a catalytically effective amount of a first platinum catalytic component dispersed on the first alumina support, a catalytically effective amount of bulk ceria and of bulk iron oxide, a catalytically effective amount of bulk nickel oxide, and baria and zirconia dispersed throughout the first coat in an amount sufficient to stabilize the alumina and the other bulk metal oxides against thermal degradation; and
a second coat comprising a topcoat overlying the first coat and carried by the carrier, and comprising a co-formed rare earth oxide-zirconia support, a catalytically effective amount of a first rhodium catalytic component dispersed on the co-formed rare earth oxide-zirconia support, and a second activated alumina support having a catalytically effective amount of a second platinum catalytic component dispersed thereon, and zirconia dispersed throughout the second coat in an amount sufficient to stabilize the activated alumina support therein against thermal degradation.

39. The catalytic composition of claim 38 including a second rhodium catalytic component dispersed on the second activated alumina support.

40. The catalyst composition of claim 38 further including a third activated alumina support on which catalytically effective amounts of a second rhodium catalytic component and a third platinum catalytic component are dispersed.

41. The catalyst composition of claim 20 wherein the bulk ceria comprises at least 90% by weight $CeO_2$, the balance comprising other rare earth oxides.

42. A catalyst composition comprising a carrier on which is disposed a catalytic material, the catalytic material comprising: a first coat carried on the carrier and comprising a first activated alumina support, a catalytically effective amount of a first platinum catalytic component dispersed on the first alumina support, and a catalytically effective amount of bulk ceria; and a second coat carried by the carrier and comprising a co-formed yttria-zirconia support, a catalytically effective amount of a first rhodium catalytic component dispersed on the co-formed zirconia support, a second activated alumina support, and a catalytically effectively amount of a second platinum catalytic compound dispersed on the second alumina support.

43. The catalyst composition of claim 42 wherein the second coat comprises a topcoat overlying the first coat.